United States Patent [19]

Pickett et al.

[11] 4,155,265
[45] May 22, 1979

[54] INTERFACE SHEAR TRANSDUCER

[75] Inventors: Stephen F. Pickett, Albuquerque, N. Mex.; Glenn F. Cochrane, Jr., Belmont, Calif.

[73] Assignee: The United States of America as represented by the Secretary of the Air Force, Washington, D.C.

[21] Appl. No.: 891,798

[22] Filed: Mar. 30, 1978

[51] Int. Cl.² .............................................. G01L 1/26
[52] U.S. Cl. ........................................ 73/841; 73/765; 73/784
[58] Field of Search ................ 73/88.5 R, 88 E, 101, 73/141 A, 765, 784, 841

[56] References Cited

U.S. PATENT DOCUMENTS

| | | | |
|---|---|---|---|
| 2,741,120 | 4/1956 | Ormsby, Jr. | 73/141 A |
| 3,576,128 | 4/1971 | Lockery | 73/141 |
| 3,602,866 | 8/1971 | Saxe | 73/88.5 X |
| 3,673,861 | 7/1972 | Handy | 73/101 |

Primary Examiner—Charles Gorenstein
Attorney, Agent, or Firm—Joseph E. Rusz; Henry S. Miller

[57] ABSTRACT

A shear transducer having two cylindrical bending beams with two full strain gage bridges so arranged to cancel acceleration induced by forces in the axis of interest.

7 Claims, 4 Drawing Figures

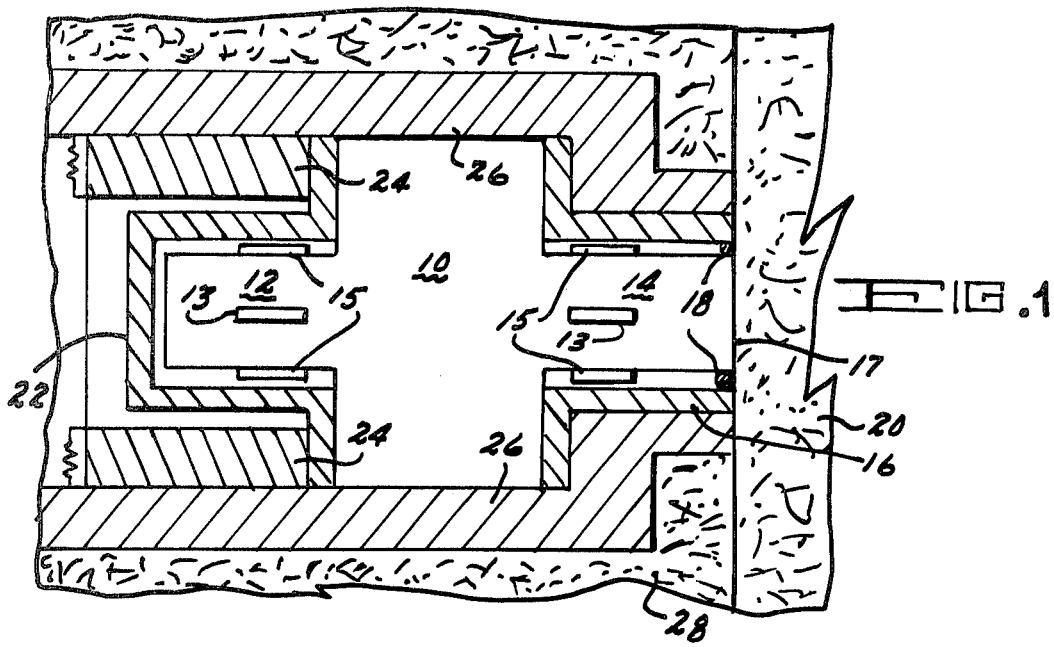
FIG. 1
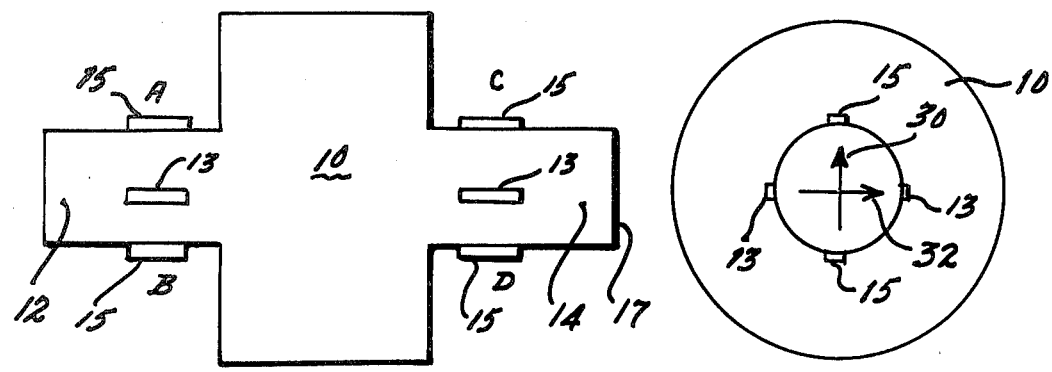
FIG. 2A
FIG. 2B
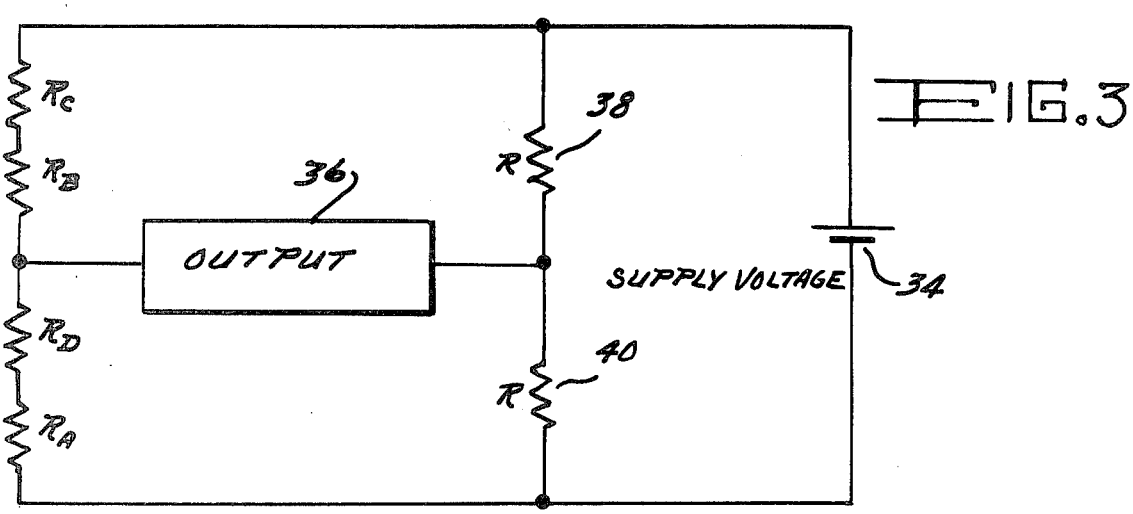
FIG. 3

INTERFACE SHEAR TRANSDUCER

STATEMENT OF GOVERNMENT INTEREST

The invention described herein may be manufactured and used by or for the Government for governmental purposes without the payment of any royalty therein.

BACKGROUND OF THE INVENTION

This invention relates generally to interface shear transducers and more specifically to dynamic shear transducers that are insensitive to extraneous acceleration forces.

When a large structure is designed to be constructed either below ground level or above ground level with a substantial subsurface foundation structure, as for example are found in skyscrapers, all forces having an effect on the structure must be carefully and accurately evaluated. Subsurface forces may orginate in a number of ways including poor earthen materials that are inherently unstable or a mixture of earthen materials of unequal quality that would cause unequal forces on the structures. Additionally, some areas of the world are more prone to earthquakes and tremors than others causing potential hazardous forces on the structure. Similarly, floods or other unusual weather extremes could effect the strength and function of deeply seated foundations.

Another area of interest is in the aspect of structure survivability in the event of a severe shock as would accompany a nuclear explosion. Such information would be necessary, not only for the predictability of structure survival in the event of hostile explosions, but also where nuclear devices might be used for mining, oil exploration or construction.

Transducers for measuring the normal loading on a structure are well known in the art and have been used with a great deal of success for the purpose for which they were employed. However, currently there is no acceptable means of measuring and predicting the highly critical dynamic shear loading on a buried structure.

In the past, structure-media interface shear loading was implied or computed by coulomb models utilizing interface coefficient of friction factors, normal stress, and structure-media relative motions. Dynamic test results compared poorly with computed model results and as a result, a new and complex computer code was developed to provide the accurate results needed. With the new code, new means were needed to evaluate it, and in particular a means for measuring dynamic shear stress. Dynamic shear stress measurements require an instrument that is insensitive to acceleration forces and operates with nearly complete independence between orthogonal stress axes.

Various dynamic parameters measured to evaluate a structure include velocity, acceleration and displacement. Other parameters included in the calculations include; soil stress, blast pressure (if any), shear and interface normal stress.

This invention provides a means for solving the difficulties found in this art in the past.

SUMMARY OF THE INVENTION

The invention comprises a shear sensitive strain transducer comprising two cylindrical beams integrally attached on either side of a primary mass element. The cylindrical bending beams have two full strain gage bridges mounted thereon. The bridge configuration eliminates undesired acceleration force readings while accurately recording the information desired. The transducer is particularly effective in measuring stress created by soil-structure interaction.

It is therefore an object of the invention to provide a new and improved interface shear transducer.

It is another object of the invention to provide a new and improved interface shear transducer that is capable of measuring dynamic shear stress.

It is a further object of the invention to provide a new and improved interface shear transducer that provides nearly complete measurement independence between forces on orthogonal axis.

It is still another object of the invention to provide a new and improved interface shear transducer that cancels unwanted acceleraton forces.

It is still a further object of the invention to provide a new and improved interface shear transducer that is low in cost, easily maintained and reliable in operation.

It is another object of the invention to provide a new and improved interface shear transducer that measures forces along a plurality of orthogonal axis.

It is another object of the invention to provide a new and improved interface shear transducer which is economical to produce and utilizes conventional, currently available components that lend themselves to standard mass production manufacturing techniques.

These and other advantages, features and objects of the invention will become more apparent from the following description taken in connection with the illustrative embodiment in the accompanying drawings.

DESCRIPTION OF THE DRAWINGS

FIG. 1 is a side elevation view of the invention partly in section.

FIG. 2a is a schematic representation of a side view of the invention.

FIG. 2b is a schematic end view of the invention.

FIG. 3 is a wiring schematic of the invention.

DESCRIPTION OF THE PREFERRED EMBODIMENT

Referring now to FIG. 1, there is shown a primary element 10 having a pair of cantilever beams 12 and 14. Positioned on the beams are strain gages 13 for measuring horizontal stress and gages 15 for measuring vertical stress. The primary element and beams may be fabricated from any suitable material. Between the end of the beam and sleeve is a silicone rubber seal so arranged as to prevent granules of the earthen media 20, and moisture from entering the transducer. A shell 24 locks the primary element in place by applying a controlled pressure against the sleeve 22 and causing the primary element to be gripped between the sleeves 16 and 22. The beams 12 and 14 are free to move within their respective sleeves. A case 26 supports the entire apparatus in the structure 28.

FIG. 2a and 2b show the invention stripped of the sleeves and shell. The element body 10 and cantilever beams 12 and 14 have strain gages 13 and 15 mounted thereon. The strain gages are electrical devices and connected to appropriate recording equipment by conventional means not shown. FIG. 2b points out that the primary element 10 and the beams 12 and 14 are cylindrical in crossection. Axes of interest are shown as vertical 30 and horizontal 32.

Referring now to FIG. 3, taken with FIGS. 2a and 2b, it is seen that the gage consists of two cylindrical bending beams with two full strain gage bridges.

The surface of the active cylindrical beam is flush with the structure and is subject to the shear stresses to be measured. It should be noted that the end surface of the beam may be fabricated to have a coefficient of friction approximately the same as the structure surface. For example, the beam may have a concrete surface, matching the structure, provided both beam ends are similar to avoid balance difficulties. The circuitry consists of two strain gage bridges, one of which is shown for the vertical axis in FIG. 3. A similar system 15 provided for the horizontal axis shown in FIG. 3. A supply voltage 34 feeds strain gage resistors $R_A$, $R_B$, $R_C$, and $R_D$ while the output 36 is connected between $R_D$ and $R_B$ to a point between matching resistors 38 and 40 connecting the lines from the supply voltage in a manner known in the art.

The shear stress component in either of the sensitive axes causes the beam to bend with a resulting bending component in the sensitive axes. If the vertical axis 30 is considered, strain gages 15 are involved and labeling the gages A, B, C and D for purposes of identification the operation of the system can be understood. A half-bridge is formed with strain gages A, B, C and D as shown in FIG. 3. Beam displacement in the sensitive axis (30) is proportional to sensitive-axis shear stress on beam (14) active surface (17). Likewise $R_C$ decreases linearly with sensitive axis shear stress. Thus, when sensitive axis shear stress is the only transducer input, bridge output is linearly proportional to sensitive axis shear stress.

However, it is infrequent that shear stress is the only force to be contended with, as acceleration is a constant factor in such measurements.

When the primary element 10 experiences only acceleration in the sensitive axis, $R_C$ and $R_A$ increase proportionally with acceleration while $R_B$ and $R_D$ decreases proportionally with acceleration. Thus, the bridge output remains zero when only sensitive axis acceleration is applied to the gage.

When acceleration orthogonal to the active surface is applied to the primary element body (10) $R_C$ and $R_D$ increase while $R_A$ and $R_B$ decrease and again the bridge is not unbalanced due to acceleration.

If a normal stress only is applied to the active surface, $R_A$ and $R_B$ do not change while $R_C$ and $R_D$ decrease equally and again the bridge remains balanced. If combinations of these desired inputs are experienced by the gage, along with sensitive axis shear stress, some combinational sensitivity may be seen. However, analysis and experience shows that these sensitivities are extremely low compared to the measured (shear) sensitivity.

Although the invention has been described with reference to a particular embodiment, it will be understood to those skilled in the art that the invention is capable of a variety of alternative embodiments within the spirit and scope of the appended claims.

What is claimed is:

1. An interface shear transducer measuring device: comprising a case; a first sleeve mounted within the case; and extending along an axis; a second sleeve mounted within the case and extending along the same axis as said first sleeve, but in the opposite direction; a primary element mounted within the case and between the first and second sleeves; a first and second cantilever beam extending away from said primary element along the axis of the first and second sleeve and respectively co-incentrically within each sleeve and said first beam so positioned that its face extends to the limits of the case and is exposed therefrom; a first pair of strain gages mounted on said first beam to measure bending movements of the beam in one direction; a second pair of strain gages, mounted on said second beam to measure bending movements of the beam in cooperation with said first pair, and electrical circuit means connected with said first and second pairs for measuring the output of the strain gages connected thereto.

2. An interface shear transducer measuring device according to claim 1 wherein the face of said first and second beams are covered with a material of the type similar to the structure under test.

3. An interface shear transducer measuring device according to claim 1 further including: a third pair of strain gages mounted on said first beam to measure bending movements of the beam in one a second direction; a fourth pair of strain gages mounted on said second beam to measure bending movements of the beam in cooperation with said third pair, and electrical circuit means connected with said third and fourth pairs for measuring the output of the strain gages connected thereto.

4. An interface shear transducer measuring device according to claim 1 wherein, said first and second pair measure bending movements in the vertical direction.

5. An interface shear transducer measuring device according to claim 3 wherein, said third and fourth pair measure bending movements in the horizontal direction.

6. An interface shear transducer measuring device according to claim 1 wherein, said electrical circuit means is a bridge circuit.

7. An interface shear transducer measuring device according to claim 3 wherein, the electrical circuit means connecting said first and second pair and said third and fourth pair is a bridge circuit.

* * * * *